United States Patent [19]

Ito et al.

[11] Patent Number: 4,671,376
[45] Date of Patent: Jun. 9, 1987

[54] AUTOMATIC DIFFERENTIAL LOCKING SYSTEM FOR A WORKING VEHICLE

[75] Inventors: Katsumi Ito, Osaka; Shigeaki Okuyama, Kawachinagano; Norimi Nakamura; Yoshizo Kuroiwa, both of Sakai; Kouji Fujiwara; Kunisuke Nakamura, both of Sakai; Osami Fujiwara, Kishiwada; Jituo Yoshida; Mitsugu Kobayashi, both of Sakai, all of Japan

[73] Assignee: Kubota, Ltd., Osaka, Japan

[21] Appl. No.: 775,855

[22] Filed: Sep. 13, 1985

[30] Foreign Application Priority Data

Oct. 31, 1984 [JP] Japan .......................... 59-164831[U]
Oct. 31, 1984 [JP] Japan .......................... 59-164833[U]
Nov. 1, 1984 [JP] Japan .......................... 59-166939[U]
Nov. 20, 1984 [JP] Japan .............................. 59-245673

[51] Int. Cl.[4] .......................................... B60K 17/35
[52] U.S. Cl. ..................................... 180/249; 180/234
[58] Field of Search ............... 180/70.1, 71, 230, 234, 180/233, 236, 248, 246, 249, 250

[56] References Cited

U.S. PATENT DOCUMENTS

| | | | |
|---|---|---|---|
| 4,298,085 | 11/1981 | Moroto et al. | 180/249 |
| 4,364,445 | 12/1982 | Iuzuka et al. | 180/70.1 |
| 4,513,276 | 4/1985 | Kubota | 180/70.1 |
| 4,552,241 | 11/1985 | Suzuki | 180/249 |
| 4,566,554 | 1/1986 | Suzuki | 180/249 |

Primary Examiner—Richard A. Bertsch
Attorney, Agent, or Firm—Jordan and Hamburg

[57] ABSTRACT

An automatic differential locking system for a working vehicle having steerable front and rear wheels, which includes a selector for selecting a steering mode of the vehicle, an actuator for operating a differential locking mechanism, and a gate for sending a control signal to the actuator in response to a signal received from the selector. The gate is adapted to send a differential locking signal to the actuator upon receipt of a parallel steering mode signal from the selector. In response to the differential locking signal the actuator actuates the differential locking mechanism. Since differential revolutions of the wheels are limited at times of parallel steering, the vehicle is capable of accurate course revisions and alterations without slipping.

18 Claims, 8 Drawing Figures

AUTOMATIC DIFFERENTIAL LOCKING SYSTEM FOR A WORKING VEHICLE

BACKGROUND OF THE INVENTION

This invention relates generally to an automatic differential locking system for a working vehicle, and more particularly to an automatic differential locking system for automatically limiting differential revolutions of front wheels or rear wheels in response to a selected steering mode.

When a working vehicle travels on an inclined ground or an unleveled ground, slipping causes a difference in revolution between a right wheel and a left wheel impairing straight running of the vehicle. It is therefore conventional practice to equip a working vehicle such as a lawn and garden tractor which needs to run straight in a reliable manner with a differential locking mechanism to forcibly stop differential revolutions of the wheels. However, when the vehicle is steered with the differential locking mechanism working at all times, one of the right and left wheels must slip and leave undesirable scratches on the ground.

In order to eliminate the above disadvantage an automatic differential locking system has been proposed in Japanese patent application published under No. (Tokugansho) 58-246744 (Kubota, Ltd.). This prior system permits the differential to be locked only when a steering angle is below a predetermined value, and releases the lockup when the steering angle exceeds the predetermined value.

On the other hand, there is a known steering mode called parallel steering in which the front and rear wheels movable parallel to one another are steered in the same direction. This steering mode is useful for steering the vehicle clear of an obstacle encountered while running, and for altering a vehicle position relative to a running course or moving the vehicle sideways. All these operations can be carried out without turning the vehicle. Since the parallel steering mode turns all the four wheels in one direction, there occurs no difference in wheel revolution and therefore little chance of slipping. Thus the parallel steering mode is particularly effective on an inclined ground.

According to the system proposed in the above noted Japanese application, the differential lockup is automatically released regardless of the steering mode when an amount of steering exceeds a predetermined value. The proposed system is therefore unable to avail itself of the effective parallel steering mode.

SUMMARY OF THE INVENTION

A primary object of this invention, therefore, is to provide an automatic differential locking system adapted to constantly maintain the differential lockup at times of parallel steering mode for improved running performance on an inclined ground or an unleveled ground.

Another object of the invention is to provide a working vehicle equipped with the above differential locking system to be capable of reliable straight running and excellent working performance.

A further object of the invention is to provide radio controls for the working vehicle equipped with the foregoing automatic differential locking system, thereby to free the operator from a tiring drive on an inclined or unleveled ground.

A still further object of the invention is to provide a differential locking safety mechanism to release the differential locking when an excessive load is encountered, thereby to save gears and other elements of the differential from damage.

According to a feature of the present invention, an automatic differential locking system for a working vehicle having steerable front and rear wheels includes selector means for selecting a steering mode of the vehicle, actuator means for actuating and releasing a differential locking mechanism, and gate means for controlling the actuator means in response to a signal received from the selector means, the gate means being adapted to send a signal to the actuator means to actuate the differential locking mechanism in response to a parallel steering mode signal received from the selector means.

According to another feature of the present invention, a working vehicle having an automatic differential locking system includes a vehicle body including steerable front and rear wheels, a steering handle mounted on the vehicle body for determining a steering amount for the front and rear wheels, selector means for selecting a steering mode of the vehicle, steering control means for steering the front and rear wheels in response to the steering amount determined by the steering handle and to the steering mode selected by the selector means, a differential locking mechanism for limiting differential revolutions of the wheels, actuator means for actuating and releasing the differential locking mechanism, and gate means for controlling the actuator means in response to a signal received from the selector means, the gate means being adapted, in response to a parallel steering mode signal received from the selector means, to send a signal to the actuator means to actuate the differential locking mechanism independently of the steering amount determined by the steering handle.

The foregoing and other objects and advantageous features of this invention will be clearly understood from the following description to be read with reference to the accompanying drawings.

BRIEF DESCRIPTION OF THE DRAWINGS

The drawings illustrate a working vehicle and an automatic differential locking system therefor according to the invention, in which.

DETAILED DESCRIPTION OF THE PREFERRED EMBODIMENT

Figure 4:
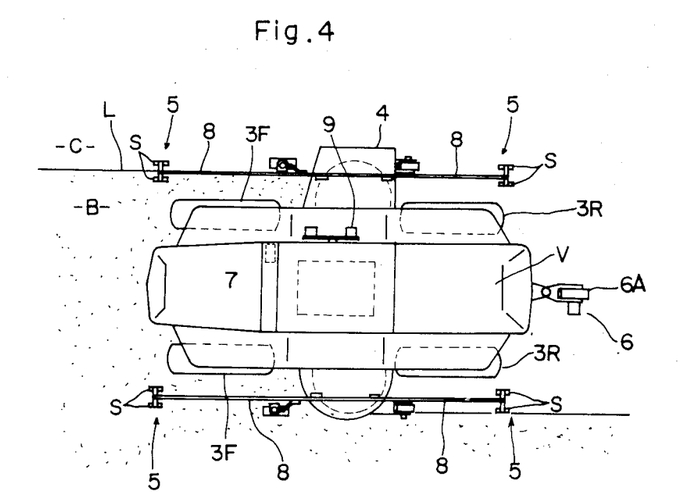
FIG. 4 is a plan view of a mower vehicle.
Figure 5:
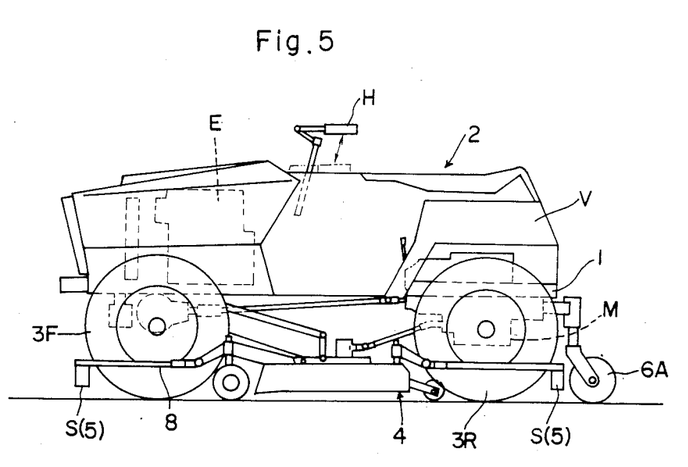
FIG. 5 is a side elevation of the mower vehicle.

Referring first to FIGS. 4 and 5, there is shown a four wheel drive mower vehicle comprising a vehicle body V including a frame 1 at a lower portion thereof. The frame 1 carries a driver's seat 2, a steering handle H and a transmission case M at a rear portion thereof, and an engine E at a front portion thereof. Below the frame 1 are ground wheels 3, namely front drive wheels 3F and rear drive wheels 3R, and a vertically movable mower 4 mounted in an underslung fashion between the front wheels 3F and rear wheels 3R and housing a disk type cutting blade.

Figure 3:
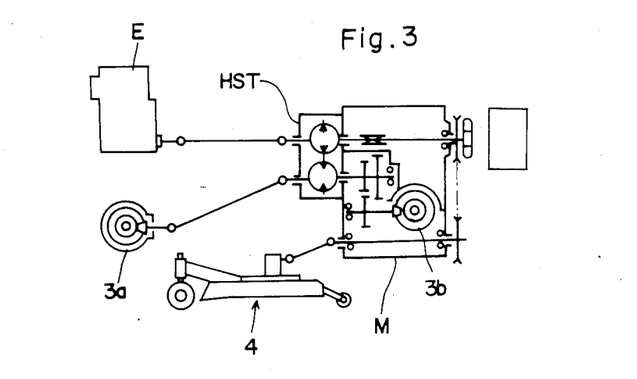
FIG. 3 is a schematic view showing a power transmission system leading from an engine.

Referring to FIG. 3, output of the engine E is transmitted to a hydraulic stepless transmission HST mounted in the transmission case M. The engine output then goes through a change speed operation effected by a change speed pedal 9 or a decelerator motor 10 acting as automatic speed control actuator. The reduced power is applied to the mower 4 as well as respective differentials 3a and 3b of the front and rear wheels 3F and 3R, to drive the front and rear wheels 3F, 3R and the mower 4 simultaneously.

Figure 6:
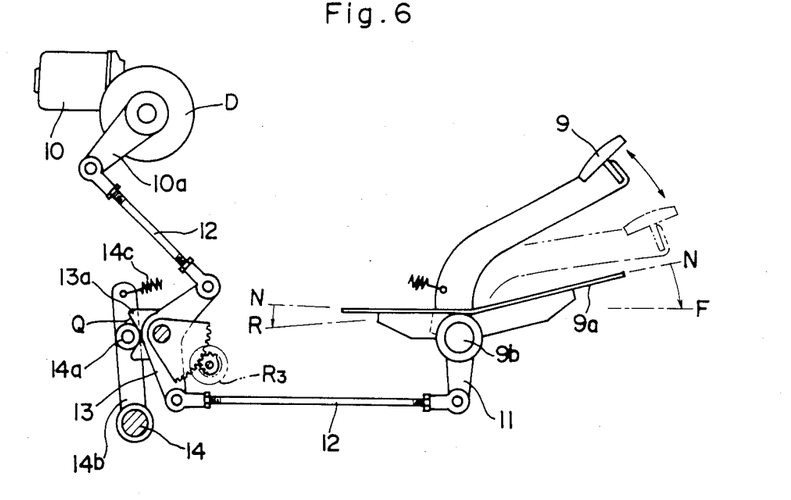
FIG. 6 is an enlarged side view showing a relationship between a change speed pedal and an automatic change speed actuator.

As shown in FIG. 6, the pedal 9 and an auxiliary plate 9a are attached to a support shaft 9b to be pivotable in unison, and a link 11 is also attached to the support shaft 9b. This link 11 is operatively connected through a push-pull rod 12 to one end of a pivot arm 13. The pivot arm 13 has the other end connected to the automatic speed control motor 10 through a push-pull rod 12, a first arm 10a and a multidisk type frictional transmission device D. A plate member 13a is attached to the pivot arm 13 to be pivotable in unison therewith. The plate member 13a defines a centrally recessed cam surface Q. A cam member 14a acting on this cam surface Q is attached to a second arm 14b extending from a control shaft 14 of the hydraulic stepless transmission HST. The second arm 14b carries a tension spring 14c at an extreme end thereof to maintain the cam surface Q and the cam member 14a in constant engagement. Thus, the further forwardly the pedal 9 or the auxiliary plate 9a is depressed from neutral N, the faster the vehicle travels forward, and the further backwardly the pedal or the auxiliary plate 9a is depressed, the faster the vehicle travels backward. When the driver removes his foot from the pedal 9 or the plate 9a, the second arm 14b automatically returns to an initial change speed position by a biasing force 25 of the spring 14c. Since the motor 10 is connected to the pivot arm 13 through the multiplate type frictional transmission device D, the pivot arm 13 is constantly maintained pivotable by the pedal operation. Therefore, the traveling speed of the vehicle is manually changeable by operating the pedal 9 even when the motor 10 is operating to effect automatic speed control.

The change speed positions of the pedal 9 and the motor 10 are detected by potentiometer R3 operable with rotations of the control shaft 14 of the hydraulic stepless transmission HST, and are fed back to a control mechanism I.

The front and rear wheels 3F and 3R are not only drive wheels but are steerable wheels operable by power steering. These wheels are steerable by the driver by means of the steering handle H, by remote control such as by means of radio signals or automatically by preset control parameters.

The steering handle H is vertically extendible and retractable relative to the vehicle body, and is lowered when out of use as at times of remote control or automatic steering control in order to be out of the way for vehicle running. A steering amount of the handle H is detected by a potentiometer Ro operatively connected thereto.

The mower 4 carries frames 8 having sensors 5 attached to extreme ends thereof such that the sensors 5 are distributed at four corners of the vehicle body V. The sensors 5 act as working area detector means and detect a boundary L between an untreated area B and a treated area C which serves as running course guide at times of automatic steering control.

The working vehicle further includes a follower wheel 6A at a rear end of the vehicle body V. The follower wheel 6A constitutes a photo-interrupter type distance sensor 6 for putting out a pulse signal Po including a certain number of pulses per unit running distance. A detected running distance is used as control parameter for initiating a turn control during automatic running of the vehicle to bring the vehicle from a completed course to a next course to run.

The vehicle further carries an orientation sensor 7 comprising a geomagnetic sensor to sense geomagnetic variations in order to detect an orientation of the vehicle when running. The detected orientation is used as control parameter for maintaining a straight running of the vehicle and determining a running direction of the vehicle under remote control or automatic steering control.

The front and rear wheels 3F and 3R are steerable as already noted, and accordingly three steering modes are available for selection. One of them is a parallel steering mode which permits the vehicle to move sideways by turning the front and rear wheels in the same direction. Another is a turn steering mode which permits the vehicle to make a small sharp turn by steering the front wheels and the rear wheels in opposite directions. The third mode is an ordinary two wheel steering mode for steering only the front wheels 3F as in the case of ordinary automobiles.

Figure 2:
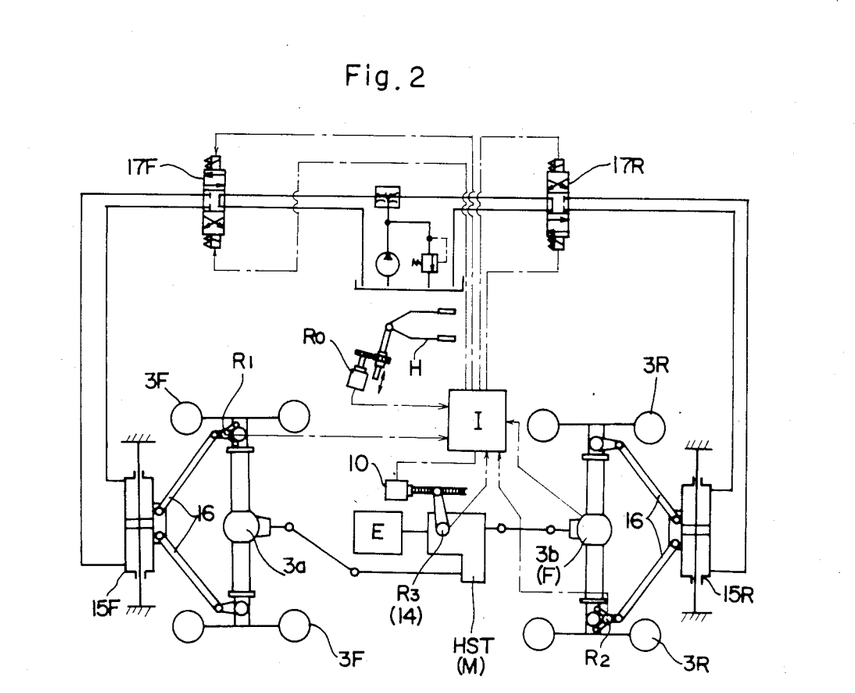
FIG. 2 is a block diagram showing an entire control system.

Referring to FIG. 2, the frame 1 carries double acting cylinders 15F and 15R at the front and rear portions thereof respectively. The cylinders 15F and 15R are operatively connected to the front wheels 3F and the rear wheels 3R through steering tie rods 16, respectively. The cylinders 15F and 15R are controlled by ON/OFF operations of electromagnetic valves 17F and 17R. The electromagnetic valves 17F and 17R are operable under a feedback control which brings the steering angles detected by potentiometers R1 and R2 respectively provided for the front and rear wheels into agreement with required steering amounts by an operation of the handle H or by radio control.

Figure 7:
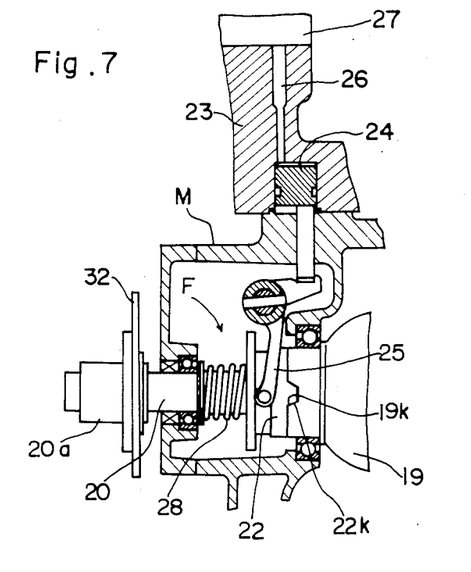
FIG. 7 is a schematic view of a differential locking structure.
Figure 8:
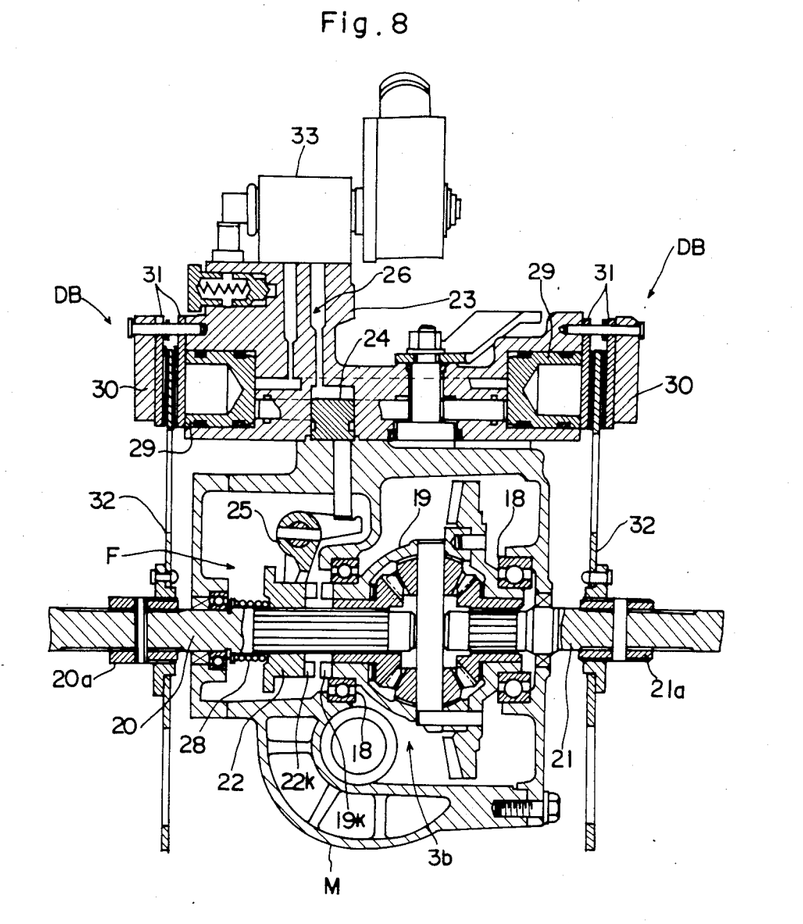
FIG. 8 is a partly broken away section of the differential locking structure.

The differential 3b of the rear wheels 3R is provided with a differential locking mechanism F as shown in FIGS. 7 and 8. In FIGS. 7 and 8 the differential 3b is supported by the transmission case M through bearings 18. The differential 3b includes a differential gear case 19, a left differential shaft 20 and a right differential shaft 21. The differential locking mechanism F includes a differential locking sleeve 22 splined to the left differential shaft 20 inside the transmission case M to be slidable axially of the left differential shaft 20. The sleeve 22 and the differential gear case 19 define a clutch device 22K, 19K therebetween which is engageable to lock the differential 3b.

The transmission case M carries a member 23 containing a piston 24 operatively connected to the sleeve 22 through a control arm 25. The member 23 defines an oil port 26 in communication with a hydraulic device (not shown) through a differential locking electromagnetic valve 27. As the piston 24 is vertically moved by an ON/OFF operation of the electromagnetic valve 27, the sleeve 22 is caused by means of the control arm 25 to slide rightward or leftward along the left differential shaft 20. As a result the clutch is operated to bring the differential locking mechanism F into or out of action. The differential locking mechanism F should desirably include a safety device to safeguard gears and other parts of the differential from damage due to overloads. For this purpose, the sleeve 22 is constantly biased by a spring 28 toward a position to engage the clutch, and the clutch has an inclined engagement structure which comes out of engagement when acted on by a torque exceeding a value set by the spring 28. Therefore, when the torque exceeding the predetermined value acts on the clutch, the differential locking mechanism F is released to unlock the differential.

The control arm 25 has a tip end abutting on the sleeve 22 to move the sleeve 22 toward a differential lock release position. The piston 24 has a stroke allowance to carry out the differential lockup release reliably in spite of wear at the tip end of the control arm 25.

The member 23 contains pistons 29 at right and left lateral sides thereof above the differential shafts 20 and 21, respectively, the pistons 29 being extendible laterally outwardly of the member 23. There is provided a member 30 attached to each of the lateral sides of the member 23 and disposed outwardly of and opposed to the piston 29. The member 23 and the member 30 have pads 31, respectively. Disks 32 are splined to bosses of the right and left differential shafts 20 and 21 outside the transmission case M, respectively, each disk 32 extending into a space between the pad 31 on the member 23 and the pad 31 on the member 30. These elements constitute hydraulic disk brakes DB. Reference number 33 in FIG. 8 denotes a brake applying electromagnetic valve. The electromagnetic valves 27 and 33 are arranged longitudinally of the vehicle body. Therefore, FIG. 7 shows the valve 27 only whereas FIG. 8 shows the valve 33 only.

Each of the boundary sensors 5 mounted on the frames 8 fixed to the mower 4 comprises a combination of two photosensors S. Each photosensor includes a light transmitter and a light receiver opposed to each other across a slit. Whether the photosensor S is on the untreated area B or on the treated area C is determined by detecting presence or absence of lawn passing between the light emitter and the light receiver. A combination of results of lawn presence or absence detection by the two photosensors S forms a basis for determining a right and left positional relationship of the vehicle body with respect to the boundary L. More particularly, the vehicle is judged to be traveling along the boundary when the photosensor S disposed laterally outwardly of the vehicle body with respect to the other photosensor S is detecting the treated area C and the other photosensor S is detecting the untreated area B. When the right and left boundary sensors 5 at the front of the vehicle body both detect the treated area C and the running distance detected by the distance sensor 6 reaches a preset reference distance corresponding to one course, the detection is used a control parameter for initiating a vehicle turning control to move the vehicle to a next course.

Figure 1:
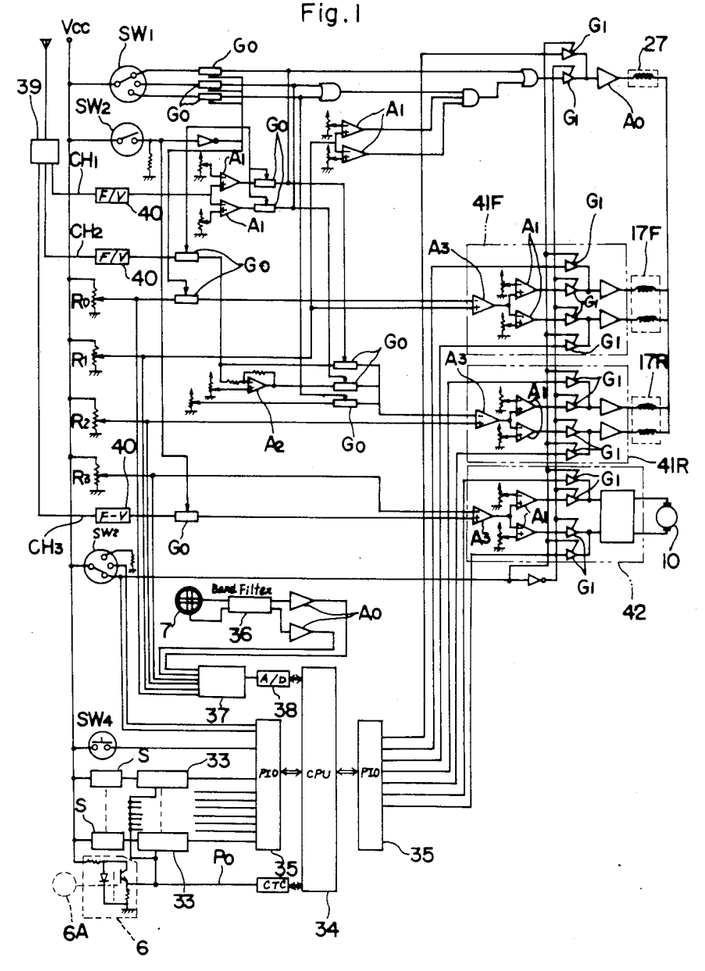
FIG. 1 is a circuit diagram showing a control mechanism.

Since the lawn passes intermittently, a working site condition detection signal obtained from the photosensor S is in form of a signal comprising broken pulses. Therefore, the signal is input to the control mechanism I after being integrated by a waveform processing circuit 33 as shown in FIG. 1. An integration time constant of the waveform processing circuit 33 is set by the pulse signal Po output by the distance sensor 6, to be an optimal value in accordance with a travelling speed of the vehicle. The above is a digital processing and functions as digital filter.

Details of the control mechanism I will be described hereinafter with reference to the circuit diagram shown in FIG. 1.

The control mechanism I includes a central processing unit (CPU) 34 for receiving the pulse signal Po from the distance sensor through a counter/timer circuit CTC, and the working area condition signals from the photosensors S through the waveform processing circuit 33 and a parallel I/P port (PIO) 35. The signals from the photosensors S are processed by means of the signal from the distance sensor 6 which generates an interrupt signal at every unit distance run by the vehicle. A position of the vehicle relative to the boundary L is determined and a control signal for steering the front and rear wheels 3F and 3R is output from a parallel I/O port 35 at an output side. Similarly, the CPU 34 receives also a signal from an operational mode selector switch SW3 and a signal from a started switch SW4 through the PIO 35 at the input side. The signal from the starter switch SW4 is for starting the control mechanism I. The signal from the operational mode selector switch SW3 is for selecting one of three modes according to which the control mechanism I is to operate. The three operational modes comprises a manual mode, a teaching mode and a playback mode. The manual mode is that in which the vehicle is steered by the driver by means of the steering handle H. In the teaching mode, the vehicle is manually driven along peripheries of a site to be treated to form the treated area C preparatory to the automatic running control, and a working range is taught to the system by sampling distances traveled and orientations detected by the orientation sensor 7 during the drive along the peripheries. In the playback mode, the vehicle is driven under radio control or automatically travels within the working range determined through the above teaching mode.

The signal output by the orientation sensor 7 is passed through a band filter 36 and a baffer Ao, and is then fed together with signals from the potentiometers R0–R3 to a multiplexer 37. The signals are digitalized by an A/D converter 38 to be fed to the CPU 34.

The control mechanism I further includes a steering mode selector switch SW1 for selecting the parallel steering mode, the turn steering mode or the two wheel steering mode at times of manual driving, and a remote control switch SW2 for switching from the manual driving to a remote control mode in which the vehicle is controlled according to guide signals transmitted from a signal transmitter (not shown) to a receiver 39.

The signals output by the receiver 39 onto a first, steering mode selector channel CH1, a second, steering control channel CH2 and a third, change speed channel CH3 are converted into voltage signals by frequency-/voltage converters 40 and, only when the remote control switch SW2 is turned on, are coupled to the interior of the control mechanism I through analog switches Go. On the other hand, when this switch SW2 is turned on, output lines from the steering mode selector switch SW1 are disabled by the analog switches Go.

The steering amount detected by the potentiometer Ro at times of manual control or the steering amount fed to the second channel CH2 at times of remote control is input to drive circuits 41F and 41R for the electromagnetic valves 17F and 17R connected to the front and rear wheels 3F and 3R. The electromagnetic valves 17F and 17R are then driven until steering angles of the front and rear wheels 3F, 3R detected by the potentiometers R1 and R2 correspond to the input steering amount.

In the case of turn steering mode the front and rear wheels 3F and 3R are steered in opposite directions. For this purpose, when in the manual mode the turn steering mode is selected by the steering mode selector switch SW1, the output signal of the potentiometer Ro which detects the steering amount of the handle H is passed through an inverting amplifier A2 to invert its polarity and is then fed to the drive circuit 41R for the electromagnetic valve connected to the rear wheels 3R. Also when the turn steering mode is selected in the remote control mode, a required steering amount signal transmitted through the second channel is passed through the inverter amplifier A2 prior to input to the electromagnetic valve drive circuit 41R.

The signal sent through the third, change speed channel CH3 is passed through the analog switch Go to a drive circuit 42 for driving the automatic speed control motor 10 only when the remote control switch SW2 is turned on. Then the hydraulic stepless transmission HST is driven until the detection value of the change speed position detecting potentiometer R3 corresponds to the signal input from the third channel CH3.

The electromagnetic valve 27 of the differential locking mechanism F is maintained in action to automatically lock the differential for the rear wheels 3R when the parallel steering mode is selected by the steering mode selector switch SW1, when the parallel steering mode is selected by the signal fed through the first channel CH1 at times of remote control mode, and when the vehicle is automatically controlled in the parallel steering mode by CPU 34 in response to detection of the boundary L by the boundary sensors 5. In the steering modes other than the parallel steering mode, the differential is automatically locked when the steering amount is small. To achieve this automatic differential lockup, the output of the potentiometer R1 for detecting the steering angle of the front wheels 3F is checked by comparators A1 of like construction and, when the output is within a predetermined range of voltage, a signal is sent out to turn on the electromagnetic valve 27. Thus, the differential locking mechanism F is released only when the vehicle is turned with a steering angle exceeding a predetermined value. When the electromagnetic valve 27 is turned on, oil is not supplied to the oil port 26. Therefore the differential locking mechanism F is maintained in operation by the clutch 19K, 22K maintained in engagement by the biasing force of the spring.

For adjusting a position of the vehicle with respect to the boundary, the parallel steering mode is preferable which permits the vehicle to move sideways without turning since the vehicle then hardly moves zigzag and leave lawn uncut. Therefore, the detection signal from the boundary sensors S is used as control parameter for parallel steering under automatic control by CPU 34. In other words, the positional adjustment is carried out by moving the vehicle sideways until the boundary sensors 5 detect the boundary L.

However, when the vehicle turns inadvertently during the parallel steering mode, the vehicle cannot be brought back to face a proper direction. On such an occasion the turn steering mode utilizing orientation variations detected by the orientation sensor 7 is employed to turn the vehicle until the orientation deviation is reduced to a permissible value. After the orientation of the vehicle is adjusted, the mode is switched to the parallel steering to effect a positional ajustment on the vehicle with respect to the boundary. Thus, a suitable steering mode is automatically selected to adjust a facing direction of the vehicle and permit the vehicle to travel straight along the boundary L.

In FIG. 1, reference A3 denotes differential amplifiers, and reference G1 denotes three state baffers for changing the control signals for the differential locking electromagnetic valve 27, the drive circuits 41F and 41R for driving the electromagnetic valves connected to the front and rear wheels, and the drive circuit 42 for the speed control motor 10, from the manual control or the remote control to the control by the CPU 34.

In the described embodiment the differential locking mechanism is provided for the rear wheels 3R, but it will be apparent that the same effect is produced by providing a differential locking for the front wheels instead. Further, in the described embodiment, in order to incorporate the safety device into the differential locking mechanism, the clutch is constantly placed in engagement by the biasing force of the spring and is released by an OFF signal sent from the electromagnetic valve 27. Where the safety device is not required, the clutch may be constantly placed in a disengaged position and be brought into engagement by an ON signal from the electromagnetic valve 27. In this case the OR gate acting as the gate means for outputting signals to the electromagnetic valve 27 in FIG. 1 may be added with an inverter. In short, it is essential to release the differential locking to permit the differential to work only when the vehicle is turned with a steering angle exceeding a predetermined value.

What is claimed is:

1. An automatic differential locking system for a working vehicle having steerable front and rear wheels, comprising
    a differential locking mechanism situated in at least one of the front and rear wheels,
    selector means for selecting a steering mode of the vehicle,
    actuator means for actuating and releasing the differential locking mechanism, and
    gate means for controlling the actuator means in response to a signal received from the selector means,
    said gate means, when the selector means is in a parallel steering mode, sending a signal to the actuator means always to actuate the differential locking mechanism, and when the selector means is in a mode other than the parallel steering mode, sending a signal to the actuator means to actuate the differential locking mechanism unless the steering amount exceeds a predetermined level.

2. An automatic differential locking system as claimed in claim 1 further comprising
    OR means for sending an output signal in response to a turning signal and a two-wheel steering mode signal received from the selector means,
    steering angle detector means for detecting a steering angle of the front wheels and, when the steering angle is within a predetermined range, sending an output signal, and
    AND means for sending an output signal in response to the output signals received from the OR means and the steering angle detector means, said gate means being adapted to send a signal to the actuator means to actuate the differential locking mechanism in response to the signal received from the AND means.

3. An automatic differential locking system as claimed in claim 2 wherein the steering angle detector means comprises a combination of potentiometer means for detecting the steering angle and comparator means.

4. An automatic differential locking system as claimed in claim 3 wherein the comparator means includes a first and a second comparator operational amplifiers having a common input, the amplifiers being adapted to set an upper limit and a lower limit of the predetermined range of steering angle, respectively.

5. A working vehicle having an automatic differential locking system, comprising
   a vehicle body including steerable front and rear wheels,
   a steering mechanism for determining a steering amount for the front and rear wheels,
   selector means for selecting a steering mode of the vehicle,
   steering control means for steering the front and rear wheels in response to the steering amount determined by the steering mechanism and to the steering mode selected by the selector means,
   a differential locking mechanism for limiting differential revolutions of the wheels,
   actuator means for actuating and releasing the differential locking mechanism, and
   gate means for sending a control signal to the actuator means in response to a signal received from the selector means,
   said gate means, when the selector means is in a parallel steering mode, sending a signal to the actuator means always to actuate the differential locking mechanism, and when the selector means is in a mode other than the parallel steering mode, sending a signal to the actuator means to actuate the differential locking mechanism unless the steering amount exceeds a predetermined level.

6. A working vehicle as claimed in claim 5 further comprising receiver means mounted on the vehicle body to receive a control signal from a radio transmitter, the receiver means including a first channel and a second channel for sending signals to the gate means and the steering control means, respectively, the first channel sending a steering mode signal and the second channel sending a steering amount signal.

7. A working vehicle as claimed in claim 6 further comprising a radio control changeover switch for enabling the first and second channels, and at the same time disabling a coupling of the steering mechanism and the selector means to the steering control means and the gate means.

8. A working vehicle as claimed in claim 7 wherein the differential locking mechanism comprises a differential locking sleeve slidably mounted on a differential shaft of a differential mechanism to be engageable with a differential gear case of the differential mechanism, the differential locking sleeve being operable by the actuator means to couple with and uncouple from the differential gear case.

9. A working vehicle as claimed in claim 8 further comprising a differential locking safety device, the safety device including spring means for biasing the differential locking sleeve to a position to couple with the differential gear case, and a safety clutch for uncoupling the differential locking sleeve from the differential gear case against a biasing force of the spring means when a torque transmission between the differential locking sleeve and the differential gear case exceeds a predetermined value.

10. A working vehicle as claimed in claim 6 further comprising
    boundary sensor means for detecting a boundary between a treated area and an untreated area of the ground and detecting a position of the boundary, and
    control means for connecting the boundary sensor means to the steering control means and the actuator means,
    said control means being adapted to actuate the steering control means, in response to detection of the position of the boundary by the boundary sensor means, to cause a parallel movement of the vehicle toward the boundary until the boundary sensor means detects the boundary, and at the same time send a control signal to the actuator means to actuate the differential locking mechanism.

11. A working vehicle as claimed in claim 10 further comprising an orientation sensor for detecting a running orientation of the vehicle, wherein the control means is adapted to measure a deviation from a reference orientation of the orientation detected by the orientation sensor, to actuate the steering control means, when the deviation exceeds a tolerance value, to turn the vehicle until the deviation is reduced to the tolerance value, and to actuate the steering control means, when the deviation is reduced to the tolerance value, to cause the parallel movement of the vehicle toward the boundary until the boundary sensor detects the boundary.

12. A working vehicle having an automatic differential locking system, comprising
    a vehicle body including a pair of front wheels and a pair of rear wheels steerable in a plurality of steering modes including a parallel steering mode,
    a steering mechanism for determining the steering amount for the front and rear wheels,
    selector means for selecting one of the steering modes,
    steering control means for steering the front and rear wheels in response to the steering amount determined by the steering mechanism and to the steering mode selected by the selector means,
    a differential locking mechanism for at least one of the front wheel pair and the rear wheel pair for limiting differential revolutions of the wheels,
    actuator means for actuating and releasing the differential locking mechanism, and
    gate means for sending a control signal to the actuator means in response to a signal received from the selector means,
    wherein the actuator means maintains the differential locking mechanism in operation in all steering modes when the steering amount is below a predetermined level, and the gate means sends a signal to the actuator means to release the differential locking mechanism only when the selector means is in a mode other than the parallel steering mode and the steering amount exceeds the predetermined level.

13. A working vehicle as claimed in claim 12 wherein the differential locking mechanism comprises a differential locking sleeve slidably mounted on a differential shaft of a differential mechanism to be engageable with a differential gear case of the differential mechanism, the differential locking sleeve being operable by the actuator means to be coupled to and uncoupled from the differential gear case.

14. A working vehicle as claimed in claim 13 wherein the actuator means comprises bias means for biasing the differential locking sleeve to a position to actuate the differential locking mechanism, and a hydraulic piston device for sliding the differential locking sleeve against a biasing force of the bias means to a position to release the differential locking mechanism.

15. A working vehicle as claimed in claim 14 wherein the differential locking sleeve and the differential mechanism define therebetween an inclined engagement structure for interconnecting the differential locking sleeve and the differential mechanism, the inclined engagement structure being disengageable by a torque acting thereon that exceeds a value determined by the bias means.

16. A working vehicle as claimed in claim 15 wherein the bias means comprises a spring.

17. A working vehicle as claimed in claim 14 further comprising receiver means mounted on the vehicle body to receive a control signal from a radio transmitter, the receiver means including a first channel and a second channel for sending signals to the gate means and the steering control means, respectively, the first channel sending a steering mode signal and the second channel sending a steering amount signal.

18. A working vehicle as claimed in claim 17 further comprising a radio control changeover switch for enabling the first and second channels, and at the same time disabling a coupling of the steering mechanism and the selector means to the steering control means and the gate means.

* * * * *